(12) United States Patent
Hackner et al.

(10) Patent No.: US 7,598,732 B2
(45) Date of Patent: Oct. 6, 2009

(54) CIRCUIT AND METHOD FOR GENERATING A CURRENT PULSE IN A WAVEGUIDE

(75) Inventors: Michael Hackner, Hemau (DE); Elmar Herzer, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 125 days.

(21) Appl. No.: 11/764,146

(22) Filed: Jun. 15, 2007

(65) Prior Publication Data

US 2007/0290921 A1 Dec. 20, 2007

Related U.S. Application Data

(63) Continuation of application No. PCT/EP2005/013451, filed on Dec. 14, 2005.

(30) Foreign Application Priority Data

Dec. 16, 2004 (DE) ......................... 10 2004 060 577

(51) Int. Cl.
*G01B 7/14* (2006.01)
*G01R 33/18* (2006.01)
(52) U.S. Cl. ................... 324/207.13; 333/148; 333/248
(58) Field of Classification Search ............ 324/207.13, 324/207.24, 244; 333/148, 239, 248, 258; 367/95, 99, 105, 118, 122, 168; 310/331
See application file for complete search history.

(56) References Cited

U.S. PATENT DOCUMENTS 3,080,537 A 3/1963 Tenten (Continued)

FOREIGN PATENT DOCUMENTS

DE 19729269 A1 7/1997

(Continued)

OTHER PUBLICATIONS

U. Tietze and Ch. Schenk, "Halbleiter-Schaltungstechnik," 1999, Springer-Verlag, Berlin, $11^{th}$ Edition, pp. 306-311.

(Continued)

*Primary Examiner*—Bot LeDynh
(74) *Attorney, Agent, or Firm*—Michael A. Glenn; Glenn Patent Group (57) ABSTRACT

A waveguide driving circuit for generating a current pulse in a waveguide includes a voltage source for providing a direct voltage, a choke the first terminal of which is coupled to a first terminal of the voltage source, a first switch the first terminal of which is coupled to a second terminal of the choke and the second terminal of which is coupled to a second terminal of the voltage source, the waveguide the first terminal of which at a first waveguide end is coupled to the first terminal of the first switch and the second terminal of which at the first waveguide end is coupled to a second terminal of the voltage source, and a controller implemented to open and close the first switch, to generate a current pulse at the terminals of the waveguide at the first waveguide end.

10 Claims, 7 Drawing Sheets

U.S. PATENT DOCUMENTS

| | | |
|---|---|---|
| 3,484,785 A | 12/1969 | Sheldon et al. |
| 4,071,714 A | 1/1978 | Satoh |
| 4,114,051 A | 9/1978 | Curtice |
| 4,896,109 A | 1/1990 | Rauscher |
| 5,165,046 A | 11/1992 | Hesson |
| 6,469,498 B1 | 10/2002 | Steinich |

FOREIGN PATENT DOCUMENTS

| | | |
|---|---|---|
| EP | 0356741 A | 3/1990 |
| EP | 0830628 B1 | 3/1998 |

OTHER PUBLICATIONS

U. Tietze and Ch. Schenk, "Halbleiter-Schaltungstechnik," 1999, Springer-Verlag, Berlin, 12$^{th}$ Edition, pp. 279-283.

(PRIOR ART)

CIRCUIT AND METHOD FOR GENERATING A CURRENT PULSE IN A WAVEGUIDE

CROSS-REFERENCE TO RELATED APPLICATIONS

This application is a continuation of copending International Application No. PCT/EP2005/013451, filed Dec. 14, 2005, which designated the United States and was not published in English.

TECHNICAL FIELD

The present invention generally relates to a waveguide driving circuit for generating a current pulse in a waveguide, and to a method for generating such a current pulse, in particular to a waveguide driving circuit and a method for generating a current pulse in a waveguide for being applied in a device for magnetostrictive position measurements.

BACKGROUND

It is desirable in many applications to impress a current pulse having the steepest edges possible of a predetermined current amplitude on a waveguide. This is, for example, useful in magnetostrictive position measurements. In this method of position measurements, a tangentially pre-magnetized wire or a tangentially pre-magnetized pipe is mechanically biased via magnetostriction by an axially magnetized position sensor. By an electrical current pulse sent through the wire or through the pipe, a soundwave propagating along the wire or pipe is triggered at the location of the magnetic position sensor. This mechanical wave deflects the tangential elementary magnets at the location of the wavefront, resulting in a magnetic wave along the wire and/or pipe propagating together with the soundwave. When arriving at the end of the assembly, the magnetic wave is detected using a coil. The time between the initial current impressed on the wire and/or pipe and detecting the magnetic wave in the coil is a very precise measure of the position of the sensor magnet which in known systems can be determined to a position of a few µm.

One of the challenges in magnetostrictive position measurements is impressing a steep-edge current impulse on the waveguide used, i.e. on the tangentially pre-magnetized wire and/or the pre-magnetized pipe. In known solutions current sources realized discretely by means of MOS transistors, wherein the current sources could be switched on and off have been used for impressing the current. The supply voltage in conventional circuit assemblies of this kind usually is between 5 volts and 40 volts. How fast the current reaches its final value is, in assemblies of this kind, not only dependent on how fast the gate of the switched transistor reaches the "on" voltage, but also on the transient behavior of the measuring distance. The measuring distance for fast processes is, above all, defined by its waveguide characteristics. Due to the very often high electrical characteristic impedance of the conductor or conductors used, the current, with small supply voltages, takes very long until reaching the final value of about 1 to 3 amperes. With a supply voltage of 5 volts and a wave resistance of the conductor used of, for example, 100 ohms, when ideally fast switching on the transistor, in the first moment after switching on, only a current of 5 V/100 ohms=50 mA can be impressed on the conductor. Then, the electrical wave at first has to propagate along the conductor. At the end of the line and/or the conductor, there is a short circuit allowing the high current flow. The wave is reflected there and after the return of the wave, another 50 mA can be impressed up to the beginning of the conductor. Consequently, the current increases over time in dependence on the length of the line and the supply voltage available.

The corresponding behavior matches the observation that a short-circuited line can be considered to be an inductance for not-too-high frequencies where the electrical length of the line is considerably shorter than a fourth of the wavelength. However, an inductance delays the increase in the current flow.

An improvement in the slew rate of the current pulse can be achieved by using higher a supply voltage allowing the full final amount of the current pulse to be achieved already in a first step. With a characteristic impedance of 220 ohms and a current final value of 1 ampere, a supply voltage of 220 volts is necessary. This voltage has to be generated in addition to the supply voltages present of the remaining electronics. This means considerably increased expenses for components increasing the area consumption and causing considerable additional cost.

Figure 7:
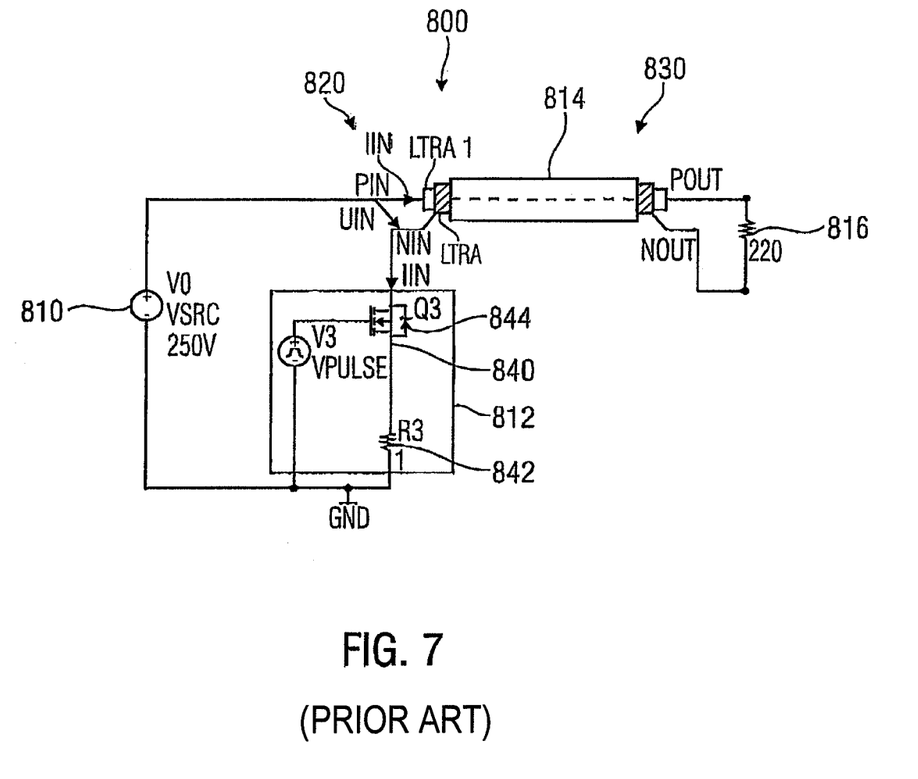
FIG. 7 is a circuit diagram of a known circuit assembly for impressing a current pulse on a waveguide.

FIG. 7 shows a circuit diagram of a circuit assembly for impressing a current pulse on a waveguide according to known solutions. The circuit assembly in its entirety is referred to by 800. The circuit assembly 800 includes a voltage source 810, a switching and regulating assembly 812, a waveguide 814 and a waveguide termination 816. The waveguide here includes a first conductor LTRA1 and a second conductor LTRA. The first conductor LTRA1 is coupled to the positive terminal of the voltage source 810 at the first end 820 of the waveguide 814. The second conductor LTRA of the waveguide 814 is coupled to the switching and regulating circuit 812 at the first end 820. The first conductor LTRA1 and the second conductor LTRA of the waveguide are connected to each other at the second end 830 of the waveguide 814 via a waveguide termination 816. The waveguide termination 816 here is formed by a resistor. The switching and regulating circuit 812 includes an n-channel MOS field-effect transistor 840 of the enhancement type the drain-source distance of which is connected in series to a resistor 842 between the terminal NIN of the second conductor LTRA of the waveguide 814 and the reference potential GND. A protection diode 844 protecting the transistor from great negative voltage peaks when switching off is connected in parallel to the drain-source distance of the n-channel MOS field-effect transistor. Furthermore, the gate terminal of the transistor is driven by a pulsed voltage source 846.

Based on the structural description of the circuit assembly 800 according to a known solution, the mode of functioning thereof will be discussed below. The starting state here is a currentless state of the waveguide 814, i.e. the switching and regulating circuit 812 has been switched off and/or has been in a high-impedance state for a sufficiently long period of time. If the switching and regulating circuit 812 is enabled by a suitable driving by the voltage source 846, i.e. if the n-channel MOS field-effect transistor 840 is placed in a conducting state, a voltage UIN which is in a context of UIN=ZW*IIN with the corresponding input current IIN will be applied to the first end 820 of the waveguide 814 via the terminals PIN and NIN. ZW here is the waveguide 814 characteristic impedance. The current IIN can be regulated by the switching and regulating circuit 812 in dependence on the gate potential of the n-channel MOS field-effect transistor 840 determined by the voltage source 846. If, for example, the voltage source 810 has a voltage of 250 volts and additionally the characteristic impedance of the waveguide 814 equals 220 ohms, the input voltage UIN of the waveguide at a current IIN of 1 ampere will be UIN=220 volts. Thus, a voltage of 30 V=250 V−220 V is across the switching and regulating circuit 812.

If the waveguide is, as described before, terminated in an impedance-correct manner by a waveguide termination 816, no signal reflection will occur at the second end 830 of the waveguide 814. The current flow through the waveguide 814 thus is approximately 1 ampere independent on time, until switching off the current flow, wherein it is assumed that the switching and regulating circuit 812 performs a stable regulation of the current flow.

The current flow can also be interrupted when suitably driving the n-channel MOS field-effect transistor 840 by the voltage source 846. Due to the termination of the transmission line 840 having the correct impedance, there are no signal reflections and the waveguide 814 will be currentless one signal runtime after switching off the n-channel MOS field-effect transistor 840.

The conventional known circuit assembly 800 has a number of disadvantages. For usual waveguide impedances (exemplarily 220 ohms) and technically usual currents (exemplarily 1 ampere), the voltage source 810 has to have very high a voltage (exemplarily 250 volts). Technically, this is very unfavorable since such a voltage is not directly available in conventional systems and has to be generated specially, entailing considerable cost for realization. In addition, conventional circuit assemblies are of disadvantage in that the second end 830 of the waveguide 814 is terminated by a resistor 816. In a quasi-stationary state, the same current passes through the terminating resistor as through the waveguide 814. This generates a considerable power loss in the terminating resistor 816. This is very difficult to dissipate and also decreases the efficiency of the circuit assembly highly so that the current consumption of an overall measuring assembly increases greatly.

SUMMARY

According to an embodiment, a waveguide driving circuit for generating a current pulse in a waveguide may have: a voltage source for providing a direct voltage; a choke the first terminal of which is in direct-current coupling to a first terminal of the voltage source; a first switch the first terminal of which is coupled to a second terminal of the choke and the second terminal of which is coupled to a second terminal of the voltage source; the waveguide the first terminal of which at a first waveguide end is coupled to the first terminal of the first switch and the second terminal of which at the first waveguide end is coupled to the second terminal of the voltage source; and controlling means implemented to open and close the first switch to generate a current pulse at the terminals of the waveguide at the first waveguide end, wherein the waveguide driving circuit is implemented such that at a switching time when the first switch is brought from a conducting state to a high-impedance state, a current impressed on the waveguide equals a current flowing through the choke directly before switching.

According to another embodiment, a method for generating a current pulse in a waveguide, the waveguide being coupled to a terminal of an inductance, may have the steps of: setting up a current flow in the inductance by closing a switch which is in direct current coupling to the inductance; and taking over the current flow to the waveguide by opening the switch, such that at a switching time when the first switch is brought from a conducting state to a high-impedance state, a current impressed on the waveguide equals a current flowing through the choke directly before switching.

The central idea of embodiments of the present invention is that it is of advantage to generate a current flow in an inductance using a voltage source having low a voltage and then to provide for, by changing a switch state, the inductance to impress the current flow on a waveguide. Here, the basic physical characteristic of an inductance of preventing a sudden change of the current flow is made use of. Whereas at the input port of the waveguide coupled to the inductance, at the point of switching on, the context between the voltage and the current is still determined via the characteristic impedance, sufficiently high a voltage forms across the inductance to impress the current necessary equaling the current flowing through the inductance before switching, on the input of the waveguide. Thus, providing a high direct voltage is not necessary in an inventive waveguide driving circuit. However, a direct voltage which is at least as high as the voltage necessary for impressing the desired current on the waveguide input is usually to be provided in conventional circuits. When using an inventive waveguide driving circuit and/or an inventive method for generating a current pulse in a waveguide, no cost is incurred here for of realizing a direct voltage source having high an output voltage. Thus, components can be saved and the setup size and cost of a waveguide driving circuit can be reduced compared to conventional circuits.

Another advantage of an inventive circuit is that at a switching point when the first switch is placed from a conducting to a high-impedance state, the current impressed on the waveguide equals the current flowing through the inductance directly before switching. The current impressed on the waveguide at the switching point and shortly after the switching point thus is well-defined. The current at the switching point thus is determined solely by the previous current through the inductance and is thus independent of any current regulating circuits which usually have unavoidable settling times. However, it is a characteristic of the inductance to counteract current changes and prevent variations. The edge steepness of the current in inventive realizations is only limited by parasitic effects occurring when opening the first switch. In conventional realizations in contrast, a current regulating circuit in which a transistor is switched on is responsible for impressing the current flow on the waveguide. In such a conventional circuit, it is considerably more problematic to achieve a precise edge, especially when greater a current has to be switched on.

In an embodiment, the waveguide is part of an assembly for a magnetostrictive positional determination. Especially in such an application in which often only low a supply voltage is available, using an inventive waveguide driving circuit and/or an inventive method is of particular advantage. Due to impressing a current pulse having high a current intensity and very steep an edge, the resolution and sensitivity of magnetostrictive position determining means can be improved considerably, at the same time reducing the circuit cost.

In another embodiment, the waveguide driving circuit includes a waveguide termination coupled to a first terminal at a second waveguide end and to a second terminal at the second waveguide end, the waveguide termination being formed by a parallel connection of a terminating resistor and a terminating inductance. Such a waveguide termination attenuates reflections at the second waveguide end due to its resistive character, whereas direct currents are short-circuited through the terminating inductance. A particularly advantageous behavior will result if the terminating resistor is matched to the characteristic impedance of the waveguide. By such an inventive design of a waveguide termination, reflections can be attenuated greatly in an advantageous manner, whereas for direct current portions there are only extremely small losses by the parasitic resistance of the terminating inductance. However, in conventional circuits not comprising inductances, direct currents flow through a terminating resistor, the result being power to be dissipated to a considerable extent. Thus, an inventive waveguide termination entails an improvement in the efficiency and a reduction in power loss, reducing the current consumption of the entire circuit assembly as well as thermal problems.

In another embodiment, the terminating inductance of the waveguide termination is connected in parallel to a diode which is implemented such that it will, in a switch-off process where the current flow at the waveguide end is interrupted, take up a current provided by the terminating inductance. Such an embodiment of the waveguide termination prevents a current from being fed from the terminating inductance to the second waveguide end in a switch-off process. Rather, the terminating diode will in this case short-circuit the terminating inductance so that a current provided by the terminating inductance will flow through the diode and not the waveguide. Thus, the terminating diode allows quickly switching off the current flow in the waveguide.

In another embodiment of the present invention, the first switch is part of a first switched current regulating circuit which is implemented to regulate or interrupt a current flow in dependence on a first driving voltage provided by the controlling means. The implementation of the first switch as part of a switched current regulating circuit allows generating, in the first inductance, a well-defined current flow which is independent on the quantity of the voltage provided by the voltage source, the quantity of the inductance and the time available for setting up the current flow through the inductance, as long as it is ensured that the current regulating circuit is active for a sufficient time. Thus, the design described improves the inventive basic circuit in which the current flow through the inductance is a function of the three parameters mentioned above of voltage, inductance and time. The precise and regulated setting of a current flow thus adds another important advantage to the inventive waveguide driving circuit.

In another embodiment, an inventive waveguide driving circuit is improved by coupling the second terminal of the waveguide at the first waveguide end to the second terminal of the voltage source via a second switched current regulating circuit, wherein the second switched current regulating circuit is implemented to regulate or interrupt a current flow in dependence on a second driving voltage provided by the controlling means. It is the task of the second current regulating circuit to regulate the current flow as soon as the voltage across the two terminals of the waveguide at the first waveguide end has reached a sufficiently low value. The time until this low voltage value is reached depends on the runtime delay of the waveguide and on the wiring at the second waveguide end. The second switched current regulating circuit thus allows maintaining a current flow through the waveguide at a nearly constant quantity over a longer period of time. Furthermore, the second switched current regulating circuit may be used for switching off the current flow through the waveguide.

Apart from that, it is advantageous for the first terminal of the choke coil to be coupled to the first terminal of the voltage source via a second switch, the second switch being implemented to separate the choke from the voltage source when no energy supply from the voltage source is necessary. It is possible by these measures to prevent energy from being supplied to the choke when it has still stored a sufficient amount of energy in its magnetic field. Thus, the load of the voltage source and thus the overall current consumption of the circuit is reduced. Furthermore, inserting the second switch between the voltage source and the choke enables allowing an operating state in which the choke basically keeps its energy.

An embodiment of the present invention includes a diode connected as a freewheeling diode between the first terminal of the choke and the second terminal of the voltage source. Such a freewheeling diode prevents the input of the real voltage source from being provided with negative voltages, which would result in the voltage source to be destroyed.

In connection with a third switch connected between the second terminal of the choke and the second terminal of the voltage source, when the third switch is closed, a circuit can be closed including the freewheeling diode, the choke and the third switch. If a small voltage is across the third switch and the freewheeling diode, the current flow through the choke and thus the magnetic field energy stored therein can be kept at a constant quantity, except for losses. Thus, even if no current flow through the waveguide is necessary, the energy can be kept and stored in the choke and does not have to be dissipated. Using a third switch is of advantage since it is implemented such that there is only very low a voltage across it. Thus, the third switch differs from the first switched current regulating circuit parallel thereto which due to its design as regulating circuit typically comprises greater losses and higher a voltage drop with an equal current flow.

Finally, it is advantageous to implement the first, second or third switch as a semiconductor switch since this allows a cheap implementation with a small setup volume and a long lifetime.

BRIEF DESCRIPTION OF THE DRAWINGS

Embodiments of the present invention will be detailed subsequently referring to the appended drawings, in which.

DETAILED DESCRIPTION

Figure 1:
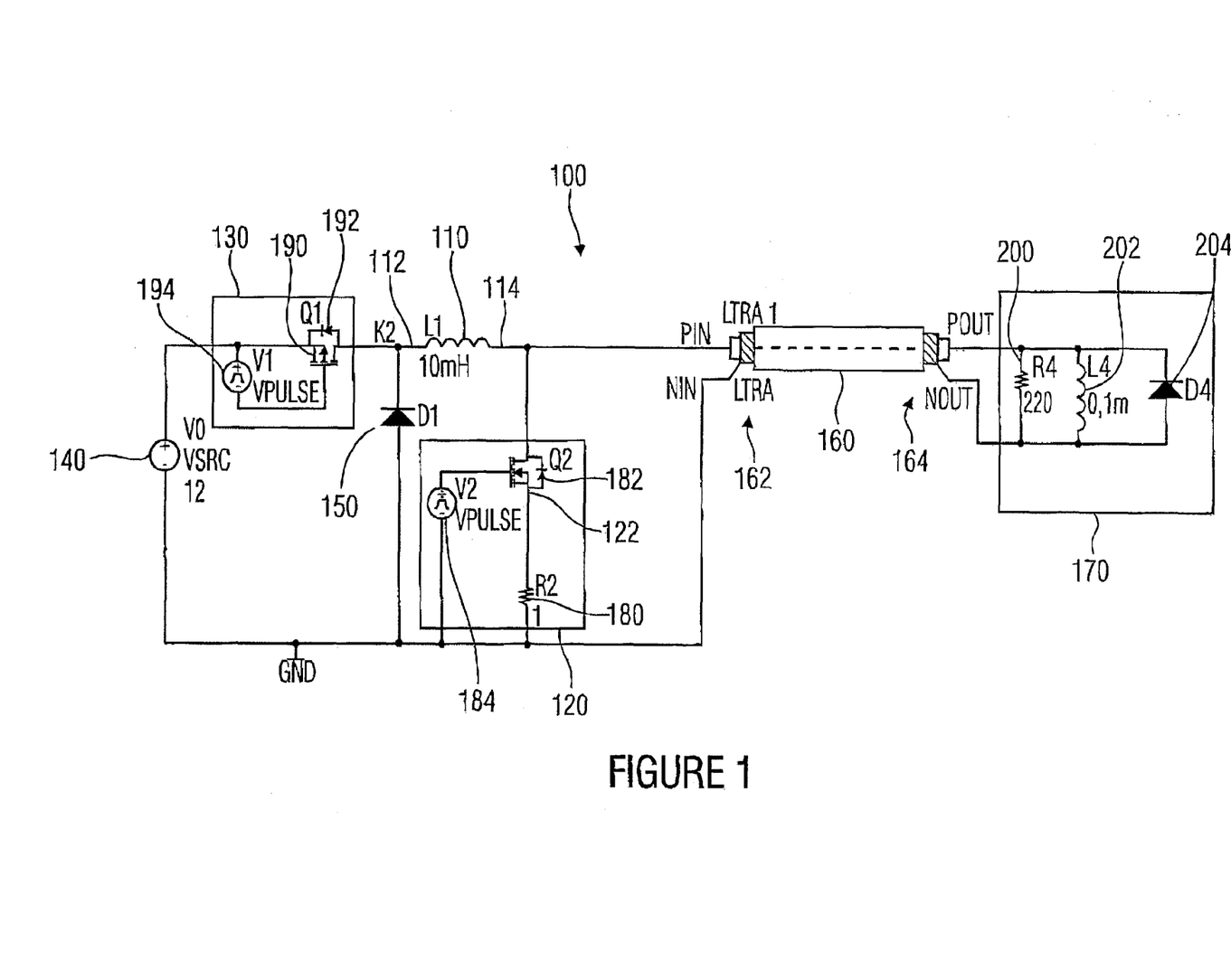
FIG. 1 is a circuit diagram of an inventive waveguide driving circuit according to a first embodiment of the present invention.

FIG. 1 shows a circuit diagram of an inventive waveguide driving circuit according to a first embodiment of the present invention. The waveguide driving circuit in its entirety is referred to by 100. The core of the driving circuit is an inductance 110 comprising a first terminal 112 and a second terminal 114. The second terminal 114 of the inductance 110 is connected to a reference potential GND via a first switched current regulating circuit 120. The first switched current regulating circuit here includes an n-channel MOS field-effect transistor 122 acting at the same time as a regulating transistor and a first switch. The first terminal 112 of the choke inductance 110 is connected to the positive terminal of a voltage source 140 via a second switch 130. The negative terminal of the voltage source 140 is coupled to the reference potential GND. Furthermore, the first terminal 112 of the choke 110 is connected to the reference potential via a freewheeling diode 150, wherein the anode of the freewheeling diode 150 is coupled to the reference potential GND and the cathode is coupled to the first terminal 112 of the choke 110. Furthermore, the waveguide driving circuit 100 includes a waveguide 160. It has, at its first waveguide end 162, a first terminal PIN coupled to the second terminal 114 of the choke 110. The second terminal NIN of the waveguide 160 at the first waveguide end 162 is coupled to the reference potential GND. The terminals POUT and NOUT at the second waveguide end 164 of the waveguide 160 are connected to a waveguide termination 170.

Subsequently, the individual components of the waveguide driving circuit 100 will be discussed in greater detail, before finally discussing the mode of functioning of the entire circuit.

The first switched current regulating circuit 120 the regulating distance of which is connected between the second terminal 114 of the choke 110 and the reference potential GND comprises an n-channel MOS field-effect transistor 122 through the drain-source distance of which flows the current to be regulated. A shunt resistor 180 by means of which the drain current is defined is connected between the source terminal of the transistor 122 and the reference potential GND. Additionally, a protection diode 182 which can protect the transistor from being destroyed in the case of a reverse connection is connected in parallel to the drain-source distance of the n-channel MOS field-effect transistor 122. The gate terminal of the n-channel MOS field-effect transistor 122 is driven by a voltage source 184 which is implemented such that it can bring the n-channel MOS field-effect transistor 122 to an operating state in which it serves, together with the resistor 180, as a constant current source and which can further bring the n-channel MOS field-effect transistor 122, if necessary, to a high-impedance state.

The second switch 130 includes a p-channel MOS field-effect transistor 190 of the enhancement type the drain-source distance of which is connected between the positive terminal of the voltage source 140 and the first terminal 112 of the choke 110. A protection diode 192 is connected in parallel to the drain-source distance. The gate electrode of the p-channel MOS field-effect transistor 190 is driven by a voltage source 194, whereby the channel of the p-channel MOS field-effect transistor 190 may optionally be brought to a high-impedance or low-impedance state.

The waveguide 160 comprises a first conductor LTRA1 and a second conductor LTRA. The first conductor LTRA1 is connected to the terminal PIN at the first waveguide end and to the terminal POUT at the second waveguide end. The second conductor LTRA is correspondingly connected to the terminal NIN and the terminal NOUT. The two conductors are part of a device for magnetostrictive position measurements. The electrical conductors LTRA, LTRA1 here are shown in a coaxial arrangement. In practice, such a geometry, however, will only be rarely used for cost reasons. Rather, it is advantageous in practice to use two parallel wires as waveguides. The present invention, however, is independent of the precise geometry of the waveguides. The illustration of a waveguide used in the figures thus is representative for any waveguide geometry which may be used for magnetostrictive position measurements.

The waveguide termination 170 includes a terminating resistor 200 to which a terminating inductance 202 and a terminating diode 204 are connected in parallel. The terminating resistor 200 is adjusted to the characteristic impedance ZW of the waveguide 160, i.e. the resistance of the terminating resistor 200 equals the characteristic impedance ZW. A small difference between the resistance and the characteristic impedance of the waveguide of, exemplarily, around 20 percent referenced to the characteristic impedance of the waveguide is also tolerable in one embodiment.

Based on the structural description, the mode of functioning of the inventive waveguide driving circuit 110 will be described in greater detail below. The inventive approach of a solution is based on the principle of a boost chopper known from the field of switching regulators and switching power supplies. Thus, the mode of functioning of a boost chopper will be described briefly to show afterwards how an inventive waveguide driving circuit can be developed based on the functional principle of a boost chopper. In a boost chopper, a current is set up or accumulated in a choke over a longer period of time from a low supply voltage. When the current has reached a predefined value or when a predefined time has expired, this choke will be switched to a capacitor in the boost chopper. Due to the self-inductance of the choke not allowing abrupt current changes, the current flowing at that time is pumped onto the capacitor. At first, this is independent of the voltage which the capacitor has due to the charge already stored on it. The boost chopper principle thus is frequently used to generate voltages which are greater than the voltage available from an energy source, such as, for example, a battery.

The capacitor is used in a boost chopper to obtain the most constant voltage possible at an output coupled to the capacitor. In the case of a current source which is to impress a current impulse on the waveguide, however, the most constant current possible is necessary. This is ensured solely by the choke. The capacitor used in the boost chopper can thus be omitted when the choke is used as a current source.

In an inventive waveguide driving circuit for feeding a fast current pulse to a waveguide, a current is at first set up in the choke 110, like in a boost chopper. Thus, the second switch 130 is in a low-impedance state and the first switched current regulating circuit 120 influences the current flowing through the choke 110. If a sufficient current flow through the choke 110 is reached or a predetermined time expired, the choke is switched to the waveguide LTRA1 to be fed in an inventive circuit. This is achieved by switching the first switched current regulating circuit 120 to a high-impedance state. Due to the high characteristic impedance of the waveguide 160 and the self-inductance of the choke 110, the automatic result is the high voltage necessary to feed the current flowing through the choke to the waveguide 160. The present circuit thus differs from a boost chopper in that the coke is not switched to a capacitor, but to the waveguide to be fed.

A particularly advantageous switching behavior results when the electrical termination of the measuring distance, i.e. of the waveguide 160, is matched to the characteristics of the waveguide 160. A short-circuit as a waveguide termination, as is used in other assemblies known so far, is unsuitable since a short-circuit reflects the current pulse and/or the pertaining voltage pulse on the line and thus causes a transient behavior which is undesirable. A simple terminating resistor as waveguide termination is also unsuitable since it causes additional energy losses which cannot be tolerated. With a constant current flow, a resistor dissipates a considerable power loss.

For this reason, a waveguide termination 170 including a parallel connection consisting of a terminating resistor 200, a terminating inductance 202 and a terminating diode 204 is used in an inventive waveguide driving circuit. In order to avoid energy losses with a constant or nearly constant current flow, in an inventive waveguide termination 170 a terminating inductance 202 is connected in parallel to the terminating resistor 200. The terminating inductance 202 which is small compared to the choke 110 will, after an electrical wavefront has arrived at the end of the measuring distance, i.e. at the second waveguide end 164 of the waveguide 160, take over the current gradually and thus minimize losses.

If the current through the waveguide is to be switched off again, the terminating inductance 202 connected in parallel to the terminating resistor 200 will, due to its self-induction, at first try to maintain the current. This can be prevented by a terminating diode 204 which here serves as a bypass diode and is connected in parallel to the terminating inductance 202. By using an inventive waveguide termination 170 and, in particular, by integrating a terminating diode 204 as a bypass diode, it can thus be achieved that the waveguide will basically be currentless after maximally two runtimes. Runtime here is the time necessary for an electrical wave to pass the waveguide 160 once.

The voltage source 140 feeding the choke 110 to generate a current can be separated from the choke 110 via the second switch 130, while the choke 110 feeds a current to the waveguide 160. During this time, the current flows via a diode 150 acting as a freewheeling diode. Switching off and/or separating the voltage source 140 has the result that the voltage source 140 as a whole has to release smaller a power since it only feeds the current over a shorter period of time.

Figure 2:
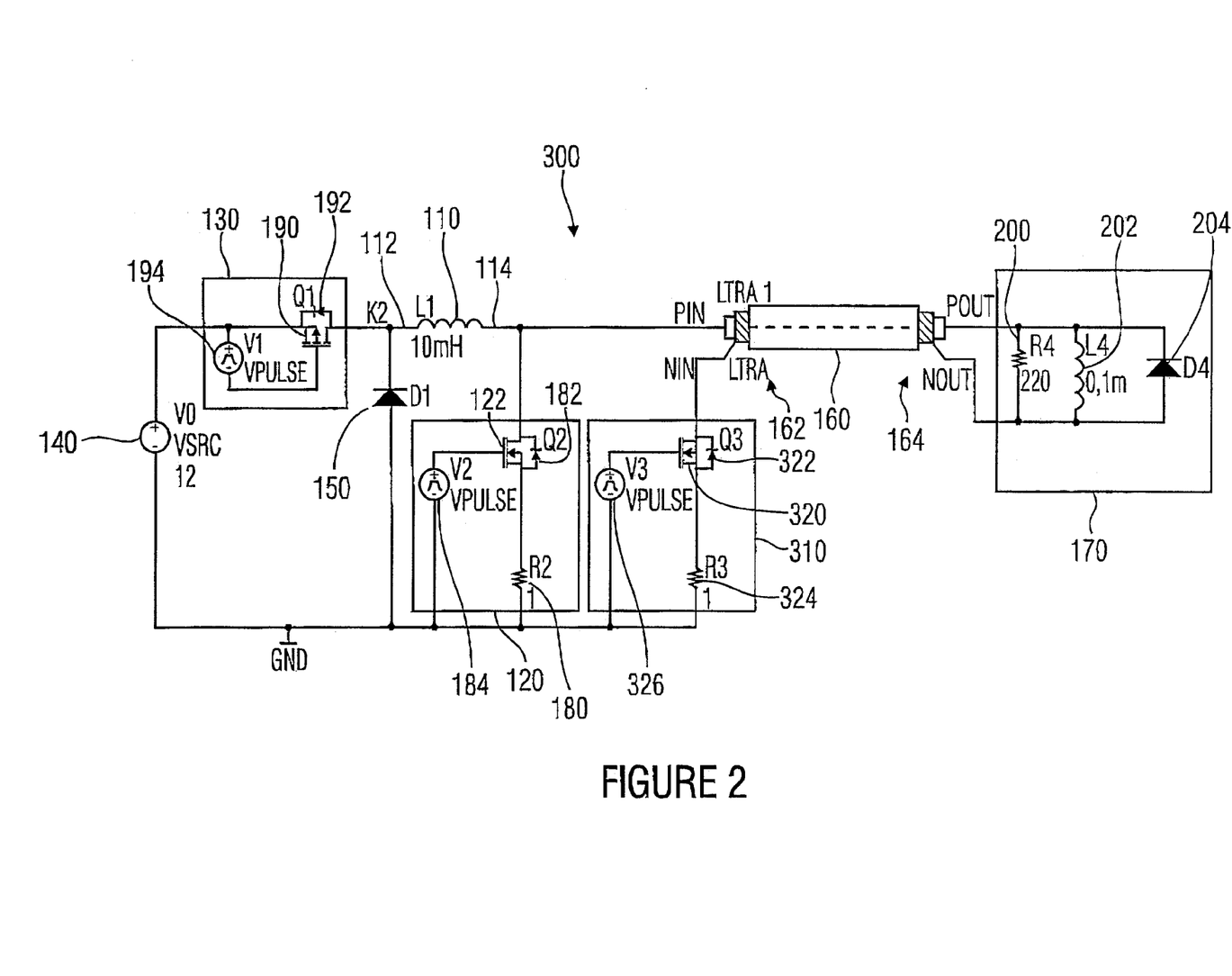
FIG. 2 is a circuit diagram of an inventive waveguide driving circuit according to a second embodiment of the present invention.

FIG. 2 shows a circuit diagram of an inventive waveguide driving circuit according to a second embodiment of the present invention. The circuit in its entirety is referred to by 300. Since the circuit 300 according to the second embodiment of the present invention varies only very slightly compared to the circuit 100 according to the first embodiment of the present invention, same means of the two circuits are provided with the same reference numerals and will not be discussed again. Rather, it will only be discussed what is the advancement of the circuit 300 compared to the circuit 100.

In the waveguide driving circuit 300 according to the second embodiment of the present invention, the second terminal NIN at the first waveguide end 162 of the waveguide 160 is not connected directly to the reference potential GND but via a second switched current regulating circuit 310. The second switched current regulating circuit 310 here includes an n-channel MOS field-effect transistor 320 of the enhancement type through the drain-source distance of which flows the current to be regulated. A protection diode 322 preventing a destruction of the transistor with negative voltage peaks is connected in parallel to the drain-source distance of the n-channel MOS field-effect transistor 320. In addition, a resistor 324 which, as feedback resistor, entails improved regulating characteristics is connected between the source terminal of the n-channel MOS field-effect transistor 320 and the reference potential GND. The gate terminal of the n-channel MOS field-effect transistor 320 is coupled to a voltage source 326 implemented to bring the n-channel MOS field-effect transistor 320 optionally to an operating state in which it takes over the function of a current regulator, or to switch same to a high-impedance state. If the n-channel MOS field-effect transistor 320 is effective as a current regulator, the quantity of the current to be provided can be adjusted via its gate potential (referenced to the reference potential GND). Of course, it is assumed here that the desired current flow can also be achieved practically due to the operating voltages and/or the waveguide impedance present.

It is made possible by using the second switched current regulating circuit to keep the current flow through the waveguide at a desired value, even in a stationary operating state. The second current regulating circuit 310 thus supplements the choke 110. The choke 110 comprises a continuous current form so that it will impress, after disabling the first switched current regulating circuit 120, the last current flowing on the waveguide 160. Without an additional second switched current regulating circuit 310, the current flow would decrease continuously according to the law $di_L/dt=1/L*u_L$. As long as there is a high voltage applied to the first waveguide 162 via the terminals PIN, NIN, i.e. greater than the voltage of the voltage source 140, the current flow through the choke 110 and thus also through the waveguide 160 will decrease continually. The speed of the decrease is proportional to the magnitude of the voltage across the choke 110 and inversely proportional to the quantity of the inductance of the choke 110. If the choke 110 is sufficiently great, i.e. the inductance of the choke is sufficient, the decrease in current is sufficiently slow and not interfering. As soon as the voltage across the terminals PIN, NIN at the first waveguide end 162 has decreases to such an extent that it is smaller than the voltage of the voltage source 140, the second switched current regulating circuit 310 can become enabled and influence the voltage across the choke 110. Influencing the voltage across the choke 110 allows controlling the current flow through the choke so that an effective current regulation can be achieved. Thus, a current flow through the waveguide 160 can practically be maintained at an approximately constant value for any time. It may be useful to integrate controlling of the second switch 130 in current regulation.

Figure 3:
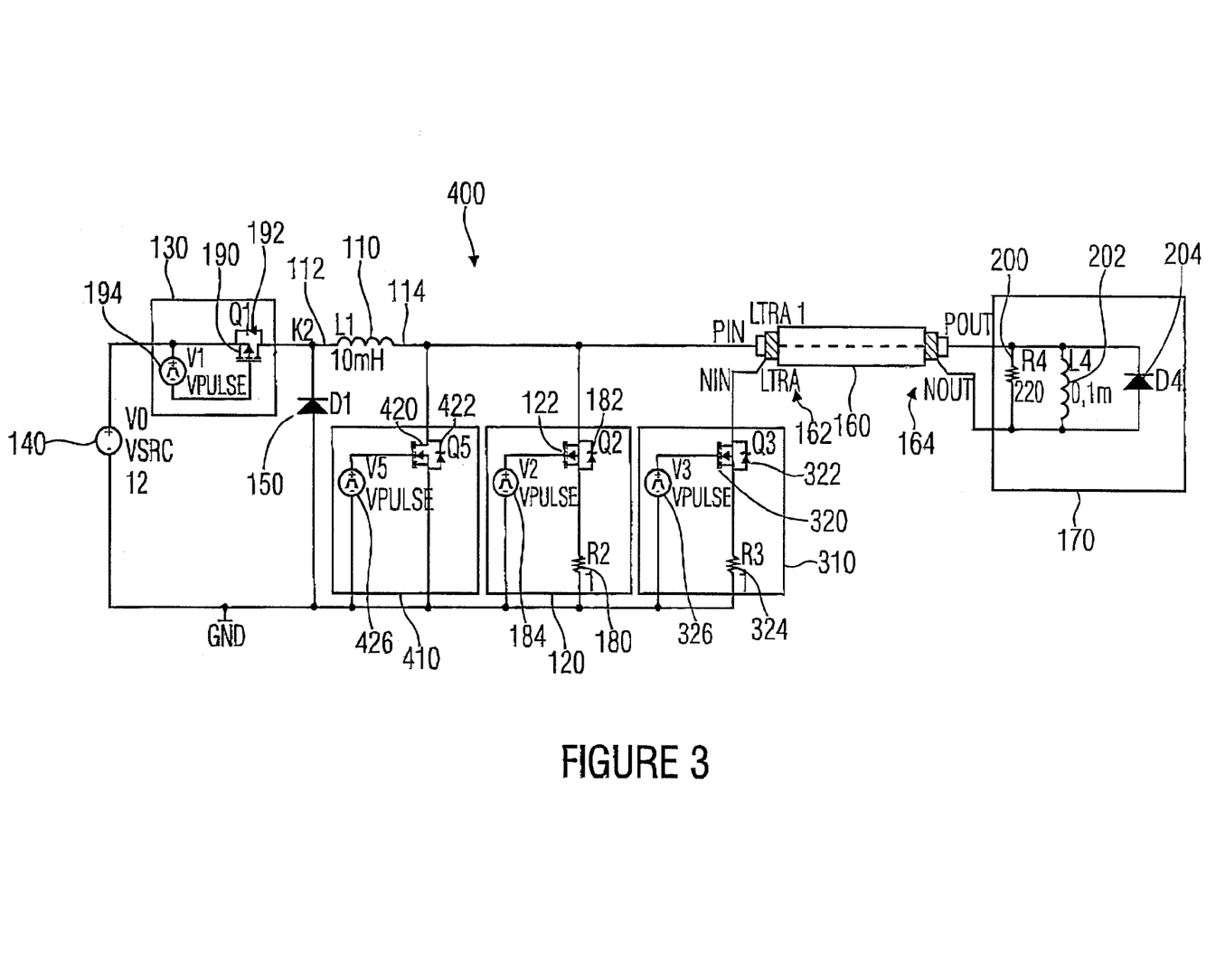
FIG. 3 is a circuit diagram of an inventive waveguide driving circuit according to a third embodiment of the present invention.

FIG. 3 shows a circuit diagram of an inventive waveguide driving circuit according to a third embodiment of the present invention. The waveguide driving circuit according to the third embodiment of the present invention is in its entirety referred to by 400 and represents an advancement of the waveguide driving circuits 100 and 300 described before. Correspondingly, means described before will not be discussed again and are referred to by the same reference numerals like the waveguide driving circuits 100 and 300.

The waveguide driving circuit 400 according to the third embodiment of the present invention is, compared to the waveguide driving circuit 300 according to the second embodiment of the present invention, supplemented by a third switch 410 connected between the second terminal 114 of the choke 110 and the reference potential GND. The third switch 410 includes an n-channel MOS field-effect transistor 420 of the enhancement type the drain-source distance of which is between the second terminal 114 of the choke 110 and the reference potential GND. A protection diode 422 is connected in parallel to the drain-source distance of the n-channel MOS field-effect transistor 420. Additionally, it is to be pointed out that the third switch 410, in contrast to the first switched current regulating circuit 320, does not include a resistor through which the main current flows. The gate terminal of the n-channel MOS field-effect transistor 420 is driven by a switched voltage source 426 implemented to bring the channel of the n-channel MOS field-effect transistor 420 optionally to a high-impedance or low-impedance state. The task of the third switch 410 is closing a circuit formed by the choke 410, the diode 150 and the third switch 410 with as low an impedance as possible, i.e. with the smallest possible losses. If the breaks between two current pulses in the waveguide are only short, the current in the choke 110 does not have to be set up again completely during the break time. Rather, it is advantageous for the current through the choke 110 to be kept at the highest level possible during the breaks. In order for the current in the choke to be kept as long as possible, the voltage drop $U_L$ across the choke has to be as small as possible in the break times, as becomes evident from the context $di_L/dt=1/L*u_L$. Since the freewheeling diode 160 already causes a noticeable voltage drop of around 0.3 Volt to 1.0 Volt, it is of advantage to avoid a voltage drop across the switch formed by the n-channel MOS field-effect transistor 122 and the protection diode 182 and the resistor 184. For this purpose, a switch consisting of the n-channel MOS field-effect transistor 420 and the pertaining protective diode 422 can be inserted into the waveguide driving circuit 300. This third switch, which together with the pertaining control voltage source 426 is referred to by 410, causes only a low voltage drop of some Millivolts.

Maintaining the current flow through the choke 110 during break times in which the waveguide 160 is essentially currentless, and in particular, introducing a third switch 410 comprising smaller losses than the first switched current regulating circuit 120 can result in a considerable reduction in the power necessary for the circuit 400. Thus, both the concept of maintaining the current flow in the inductance and a low-loss design of the circuit necessary contribute to improving the electrical efficiency of the inventive circuit.

Figure 4:
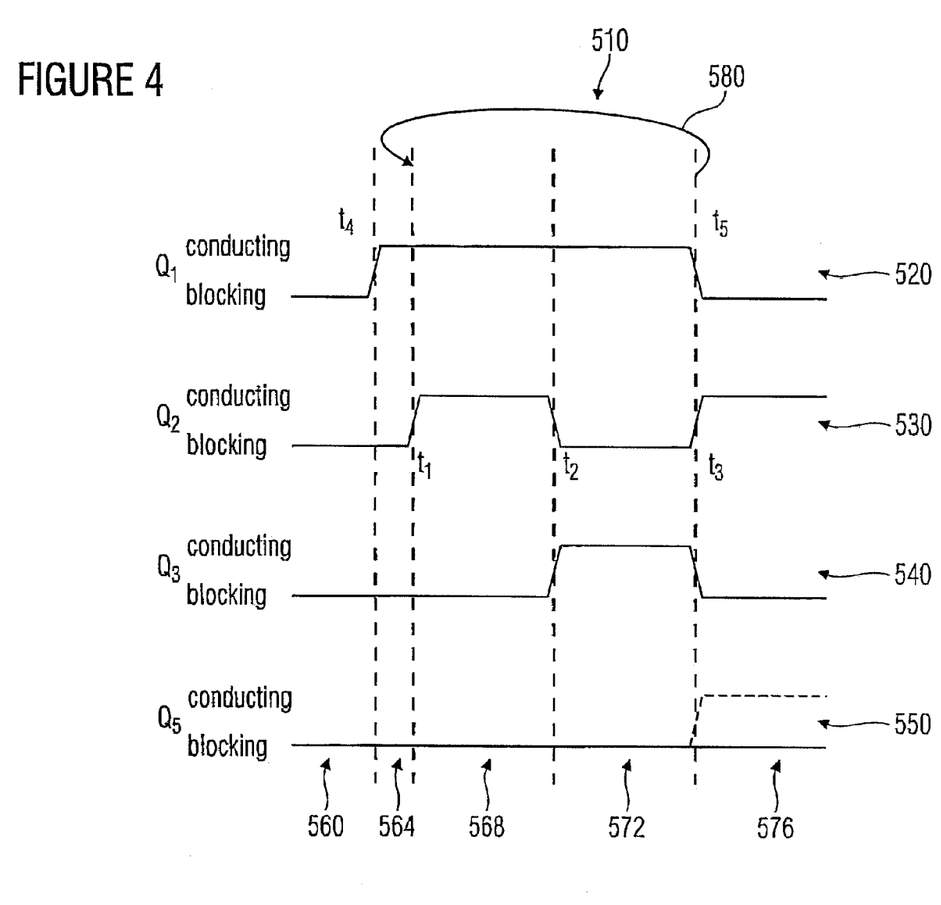
FIG. 4 is a time illustration of the switching forms for an operation without a current maintaining cycle in an inventive waveguide driving circuit according to the third embodiment of the present invention.

Time forms in the operation of an inventive waveguide driving circuit 400 according to the circuit embodiment of the present invention will be discussed subsequently in greater detail referring to FIGS. 4 and 5. FIG. 4 shows a time representation of the switching forms for an operation without a current maintaining cycle in an inventive waveguide driving circuit 400 according to the third embodiment of the present invention. The switching forms in their entirety are referred to by 510. They may be controlled by controlling means providing corresponding control voltages for the switching elements and/or gate potentials for the MOS field-effect transistors 122, 190, 320, 420. The control voltage sources 184, 194, 326, 426 may thus be considered as part of controlling means generating the forms described referring to FIGS. 4 and 5.

A first time representation 520 shows the switching state of a switching element Q1 corresponding, in a switching assembly 400, to the p-channel MOS field-effect transistor 190, in connection with the respective protection diode 192. Put differently, the first time representation shows the switching form of the second switch 130. It is indicated here whether the corresponding switch 130 and/or the respective switching transistor 190 is in a conducting or blocking stage.

Similarly, the second time representation 530 shows the switching state of a switch referred to by Q2. The switch Q2 corresponds to the n-channel MOS field-effect transistor 122 in the first switched current regulating circuit 120, including the respective protection diode 182. If the switch Q2 is blocking, the first switched current regulating circuit 120 will provide no and/or only a negligible current. However, the first switched current regulating circuit 120 allows the current flow to be regulated with a conducting switching element Q2. The quantity of the regulated current flow for a conducting stage of Q2 depends on the voltage provided by the control voltage source 184.

A third time representation 540 describes the switching state of a switching element Q3 corresponding to the n-channel MOS field-effect transistor 320 in connection with the pertaining protection diode 322. The third switching element Q3 is part of the second switched current regulating circuit 310. If the switching element Q3 and/or the n-channel MOS field-effect transistor 320 is conducting, the second switched current regulating circuit 310 will provide a current the quantity of which basically depends on the voltage provided by the control voltage source 326. If the switching element Q3 and/or the n-channel MOS field-effect transistor 320 is blocking, only a very low current can flow through the second switched current regulating circuit 310. Thus, current flow to the first waveguide 162 is interrupted.

A fourth time representation 550 shows a switching state of a switching element Q5 which in the waveguide circuit 400 according to the third embodiment of the present invention is formed by the n-channel MOS field-effect transistor 420, in combination with the respective protection diode 422. If the time representation indicates that Q5 is conducting, this means that the channel of the n-channel MOS field-effect transistor 420 will be in a low-impedance state, whereas otherwise it will be in a high-impedance state. The respective states of conducting and blocking are determined by the voltage provided by the control voltage source 426.

The time representation 510 shows the switching states occurring when operating a waveguide circuit 400, whereas a possible current maintaining cycle has not yet been taken into consideration. Five states can be seen in the time form. In the starting state 560, the entire circuit assembly is powerless. All the switching elements Q1, Q2, Q3 and Q5 are in a blocking state. Correspondingly, the first switched current regulating circuit 120 and the second switched current regulating circuit 310 do not provide a current and the second switch 130 and the third switch 410 are open.

The starting state is followed by a switch-on state 564. Here, only the switching element Q1 is in a conducting state. Correspondingly, the second switch 130 in the waveguide driving circuit 400 is closed. However, no current may flow since the other switches and/or the switched current regulating circuits 120, 310 are still disabled.

The switch-on state 564 is followed by a current setup state 568. Here, the first switching element Q1 and the second switching element Q2 are conducting. The choke 110 is thus coupled to the voltage source 140 via the second switch 130 and the first switched current regulating circuit 120. The first switched current regulating circuit 120 is in an operating state in which a current regulation is performed. A current is setup in the choke 110 in the current setup state, wherein the first switched current regulating circuit 120 consisting of the second switching element Q2 (n-channel MOS field-effect transistor 122; protection diode 182) and the resistor 180 regulates the current in dependent of the voltage of the control voltage source 184.

If a desired current flow through the choke has been reached or a predetermined duration has expired, the circuit changes to a current take-over state 572. Whereas the switching element Q1 still remains in a conducting state, i.e. the switch 130 is closed, the second switching element Q2 and thus also the first switched current regulating circuit 120 are in a blocked state. However, the second switched current regulating circuit 310 is active in the current take-over state 572, i.e. is driven such that it causes the current to be regulated. The fifth switching element Q5 is still switched off. In this operating state, the current through the choke 110 is taken over to the waveguide 160. A circuit is closed via the second switch 130, the waveguide 160, the waveguide termination 170, the second current regulating circuit 310 and the voltage source 140. A regulation of the current flow takes place via the second current regulating circuit 310, the quantity of the regulated current flow being established by the characteristics of the n-channel MOS field-effect transistor 320, the resistor 324 and the voltage provided by the control voltage source 326. Ideally, the current regulation is implemented such that the regulated current equals the current impressed by the choke 110 at the switching time from the current setup state to the current take-over state.

In a switched-off operating state 576, the first switching element Q1 is finally brought to a blocking state, thereby the second switch 130 being blocking. The second switched current regulating circuit 310 is also disabled. A current flow through the choke 110 is reduced via the first switched current regulating circuit 120 and the freewheeling diode 150, the quantity of the current basically being established by the n-channel MOS field-effect transistor 122, the resistor 180 and the voltage of the control voltage source 184. The energy stored in the choke 110 generates a power loss in the respective elements, i.e., in particular, in the n-channel MOS field-effect transistor 122, the resistor 184 and the diode 150. If necessary, the switching element Q5 may also be brought to a conducting state so that the third switch 410 is conducting.

In addition, it is to be pointed out that the current setup phase 568 and the current take-over phase 572 together can be repeated several times, as is indicated by the repetition arrow 580. Thus, several current pulses can be generated in the waveguide 160, before the current in the inductance is reduced in the switch-off phase 576. The electrical efficiency of an inventive waveguide driving circuit 400 is increased by such a procedure.

Figure 5:
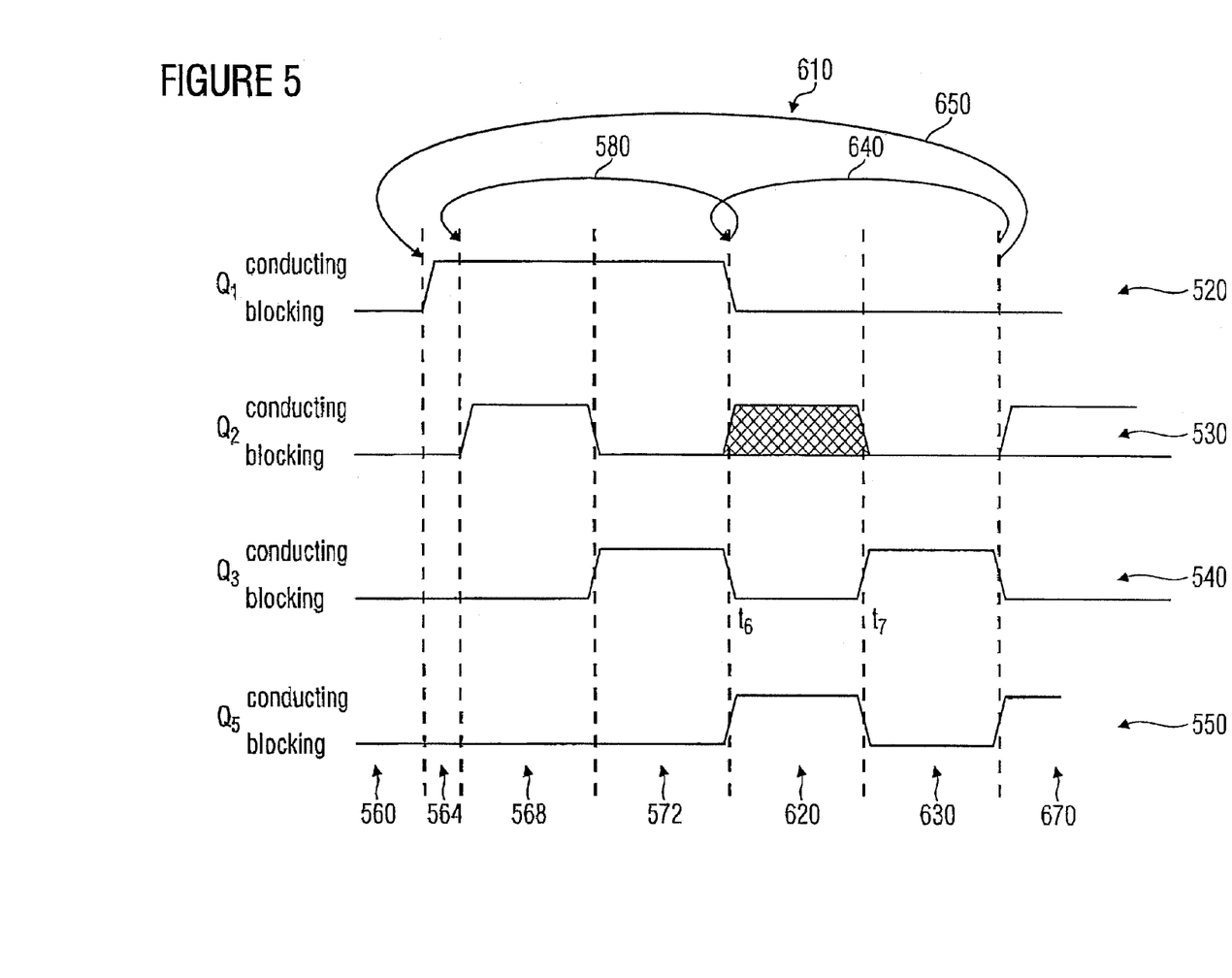
FIG. 5 is a time illustration of the switching forms for an operation including a current maintaining cycle in an inventive waveguide driving circuit according to the third embodiment of the present invention.

FIG. 5 shows a time representation of switching forms for an operation including a current maintaining cycle in an inventive waveguide circuit 400 according to the third embodiment of the third invention. The time representation in its entirety is referred to by 610. Since the time forms shown here represents a continuation of the time forms shown in FIG. 4, corresponding time forms and states are given the same reference numerals in FIG. 5 as is FIG. 4. Thus, a repeated description thereof is omitted.

It is only to be pointed out that the powerless starting state 560, the switch-on state 564, the current setup state 568 and the current take-over state 572 in the flow pattern shown here are performed in the same manner and order like in the time form described referring to FIG. 4. The current take-over state 572 in the present flow pattern is followed by a current maintaining state 620. In this state, the first switching element Q2 is blocked so that the second switch 130 is also blocking. Thus, the circuit is separated from the voltage source 140. The second switched current regulating circuit 310 is also inactive, so that a current flow at the first waveguide end 162 is interrupted. The fifth switching element Q5, however, is in a conducting state. Put differently, the n-channel MOS field-effect transistor 420 is in a low-impedance state and thus the third switch 410 is closed. Optionally, the second switching element Q2 may still be in a conductive state so that the first switched current regulating circuit 120 also contributes to a current flow. Thus, a circuit is closed via the choke 110, the third switch 410 and the diode 150 and maybe via the first switched current regulating circuit 120, allowing the choke 110 to basically maintain its current flow. The losses occurring in the third switch 410 and/or the n-channel MOS field-effect transistor 420 and the diode 150 are small. Thus, not only is the current flow through the choke 110 basically maintained, but also the energy stored in the choke. The smaller the voltage drop across the third switch 410 and the diode 150, the smaller the energy loss.

The current maintaining state 620 is followed by an energy-saving current take-over state 630 basically corresponding to the current take-over state 572. However, in the energy-saving current take-over state 630, the second switch 130 is opened. Thus, no energy is taken from the voltage source 140. Rather, the circuit is closed via the freewheeling diode 150.

If several current impulses are to be output to the waveguide 160 and the choke 110 is implemented to store a sufficient amount of energy, the current maintaining state 620 and the energy-saving current take-over state 630 may be repeated several times, as long as the choke 110 contains a sufficient amount of energy. This possible repetition is indicated by the repetition arrow 640. If the energy-saving current take-over state 630 has been repeated so frequently that the choke 110 no longer has a sufficient quantity of energy, the time form may be continued by a current setup state 568. Depending on the application, this repetition in the time form indicated by a repetition arrow 650 can be passed once, or several times, or be omitted.

For reasons of clarity, it is again pointed out that the repetitions indicated by the repetition arrows 580, 640, 650 may each be passed once or several times, or even be omitted completely.

The time form shown is completed by a switch-off state 670 in which the current is reduced via the third switch or the first switched current regulating circuit 120.

A particularly energy-saving operation of waveguide driving circuit 400 is possible by introducing a current maintaining state 620 and an energy-saving current take-over state 630, where the voltage source 140 is not loaded. In particular, the presence of a low-loss third switch 410 including a switching element Q5 contributes to saving energy.

Figure 6:
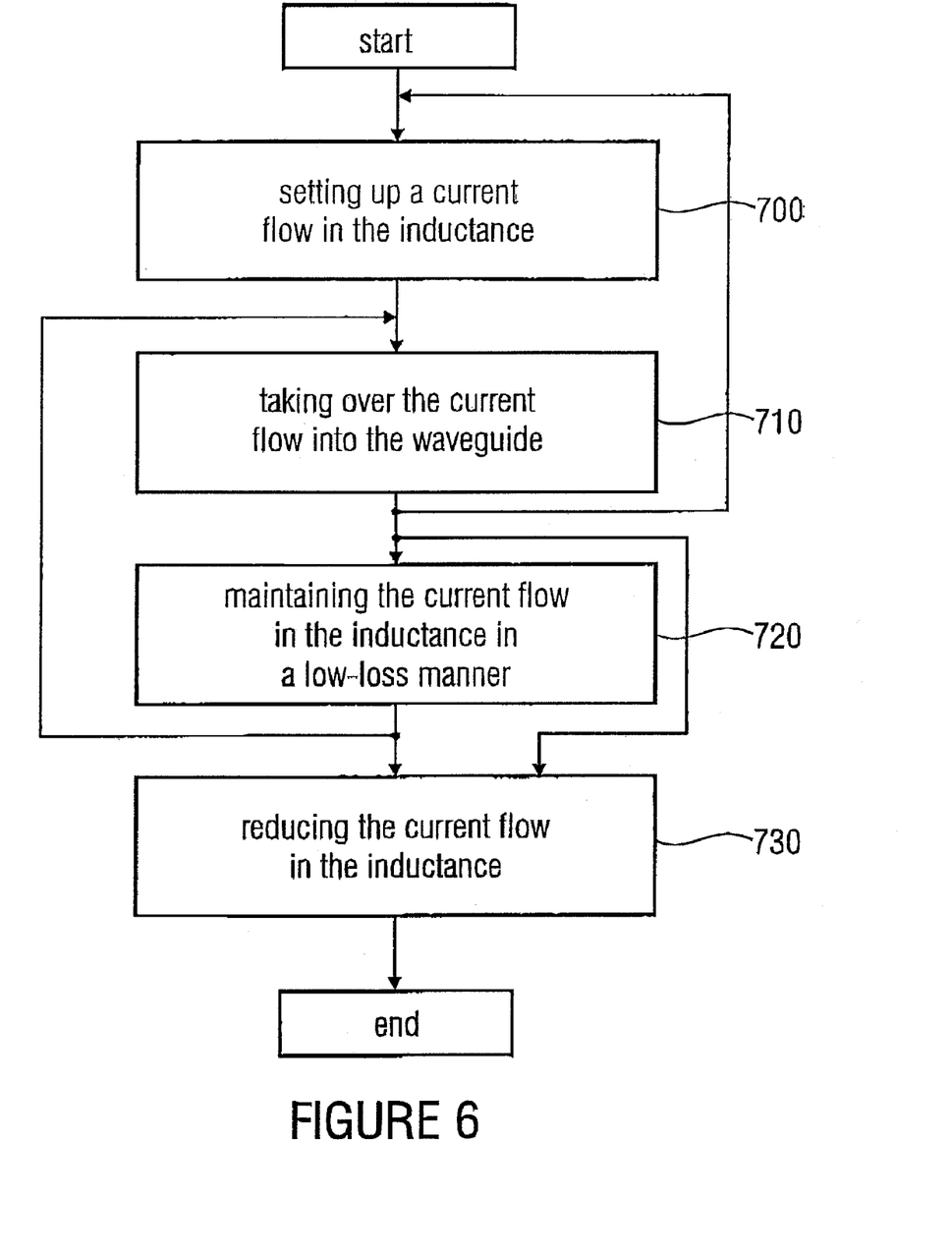
FIG. 6 is a flow chart of an inventive method according to an embodiment of the present invention.

FIG. 6 shows a flow chart of an inventive method for providing a current pulse in a waveguide according to an embodiment of the present invention. It is assumed for performing an inventive method that an inductance, like a choke coil, which can be coupled to a waveguide such that a current flow through the coupling coil can be taken over to the waveguide is available. Additionally, it is assumed that it is possible to set up a current flow in the inductance. In addition, a suitable assembly for maintaining a current flow through the inductance is assumed to be present.

Corresponding to the inventive method for generating a current pulse in a waveguide, in a first step 700, a current flow in the inductance is set up. For this purpose, the inductance may, for example, be connected to a direct voltage source. Setting up the current flow may be terminated when a previous duration has expired or when the current flow through the inductance has reached a desired value. Setting up the current flow may also include regulating the current flow. Furthermore, it is possible for setting up the current flow to be replaced by adjusting a desired current flow, wherein it is possible to reduce the current flow if there is a greater current flow through the inductance than necessary at the beginning of the step.

In a second step 710, the current flow through the inductance setup in the first step 700 is taken over to the waveguide. This may exemplarily take place by suitably adjusting switching means. Taking over the current flow may include opening an existing circuit and closing another circuit. Due to the inductance's characteristic of maintaining a current flow, the current flow set up in the first step 700 is thus impressed on the waveguide. With a suitably great implementation of the inductance, the current flow in this case will only decrease slowly.

In another optional step, the current flow can be maintained for a predetermined duration. This step may also include regulating the current flow through the waveguide. In addition, one or several switching processes may take place to exemplarily switch on or off other inductances.

If the current flow through the waveguide has been maintained for a predetermined duration, there will be different possibilities of continuing the process. It is possible for the first step 700 of setting up a current flow in the inductance to be repeated. It is possible by this to generate further current pulses in the waveguide, even if the energy stored in the inductance has already decreased greatly. Taking over 710 the current flow to the waveguide can be followed by a third step 720 of maintaining the current flow in the inductance in a low-loss manner. It is also possible to, after taking over the current flow in the waveguide, reduce the current flow in the inductance in a step 730, and then terminate the inventive method.

Maintaining 720 the current flow in the inductance in a low-loss manner may for example include closing a circuit by means of which it is ensured that the voltage across the inductance is kept sufficiently close to zero. In an embodiment, maintaining the current flow in the inductance in a low-loss manner may include bridging the inductance.

In another step 710, after maintaining 702 the current flow in the inductance in a low-loss manner, the current flow can be taken over to the waveguide. It is also possible to reduce the current flow in a step 730.

This step 730 may for example include returning the energy stored in the inductance to a source. Thus, a low-loss operation can be ensured. Reducing the current flow may also include dissipating the energy stored in the inductance.

As is indicated in the flow chart according to FIG. 6, individual steps or combinations of steps can be repeated several times. However, a repetition is not necessary. Furthermore, it is pointed out that the order of the steps may be changed as long as it is ensured that a current flow is taken over to the waveguide.

Thus, the present invention provides a circuit assembly and a method by means of which it is possible to generate a current pulse from a low supply voltage already present by means of suitable energy storages. The inventive waveguide drive circuit, compared to a known solution, comprises a great number of advantages. Thus, a current pulse can be generated from a small voltage source, which is necessary anyway for the remaining electronics in a more complex system. Thus, no additional (high) voltage source having a voltage of several 100 Volts is necessary for generating a current pulse. The cost of realizing a circuit able to provide a current pulse is thus reduced considerably. Expensive and, as far as volume is concerned, large transformers, for example, can be dispensed with.

By terminating the end of the waveguide with three parallel elements, resistor, inductance and a freewheeling diode, the power loss of the assembly is considerably reduced, since the inductance 202 can conduct a predetermined current at smaller a voltage than would be possible when using a terminating resistor 200 alone. The terminating diode 204 serving as a freewheeling diode for the terminating inductance 202 further allows the current in the waveguide to be very switched off abruptly.

If the shunt resistors 184,324 are omitted, the current reached at a final point in the choke can be controlled via the time in which the current in the choke 110 is set up. However, this will only work in a defined manner if it is ensured that a defined current flows in the choke 110 at the beginning of a cycle. By means of such a design, the circuit cost and power loss of an inventive waveguide driving circuit can be reduced.

If the current pulse has to be fed to the waveguide for a short time only, exemplarily only several microseconds, the second switched MOS current regulating circuit consisting of the n-channel MOS field-effect transistor 320, including the protection diode 322, the resistor 324 and the control voltage source 326 can also be omitted. In this case, the choke 110 alone provides for a sufficiently constant current. Such a simplified circuit is shown in FIG. 1.

Additionally, the inventive circuit can be improved by keeping the voltage drop across the choke 110 in the break times where no current is impressed on the waveguide small by a third switch 410 having an n-channel MOS field-effect transistor 420 as a switching element. Thus, a further reduction in the power loss can be achieved.

The inventive circuit realization thus shows a great number of characteristics by means of which impressing a current on a waveguide can be improved considerably compared to conventional circuits. Apart from decreasing the circuit cost, in particular with regard to the voltage supply necessary, reducing the power loss is also a decisive advantage of an inventive circuit implementation.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A waveguide driving circuit for generating a current pulse in a waveguide, comprising:
    a voltage source for providing a direct voltage;
    a choke the first terminal of which is in direct-current coupling to a first terminal of the voltage source;
    a first switch the first terminal of which is coupled to a second terminal of the choke and the second terminal of which is coupled to a second terminal of the voltage source;
    the waveguide the first terminal of which at a first waveguide end is coupled to the first terminal of the first switch and the second terminal of which at the first waveguide end is coupled to the second terminal of the voltage source; and
    a controller implemented to open and close the first switch to generate a current pulse at the terminals of the waveguide at the first waveguide end,
    wherein the waveguide driving circuit is implemented such that at a switching time when the first switch is brought from a conducting state to a high-impedance state, a current impressed on the waveguide equals a current flowing through the choke directly before switching.

2. The waveguide driving circuit according to claim 1, wherein the waveguide is part of an assembly for magnetostrictive position measurements.

3. The waveguide driving circuit according to claim 1, wherein a waveguide termination coupled to a first terminal of the waveguide at a second waveguide end and to a second terminal of the waveguide at the second waveguide end is formed by a parallel connection of a terminating resistor and a terminating inductance.

4. The waveguide driving circuit according to claim 3, wherein a diode is connected in parallel to the terminating inductance of the waveguide termination, the diode being implemented such that it takes up a current provided by the terminating inductance in a switch-off process where a current flow is interrupted at the first waveguide end of the waveguide.

5. The waveguide driving circuit according to claim 1, wherein the first switch is part of a first switched current regulating circuit implemented to regulate or interrupt a current flow in dependence on a driving voltage provided by the controller.

6. The waveguide driving circuit according to claim 1, wherein the second terminal of the waveguide at the first waveguide end is coupled to the second terminal of the voltage source via a second switched current regulating circuit,
wherein the second switched current regulating circuit is implemented to regulate or interrupt a current flow in dependence on a second driving voltage provided by the controller.

7. The waveguide driving circuit according to claim 1, wherein the first terminal of the choke coil is coupled to the first terminal of the voltage source via a second switch, the second switch being implemented to separate the choke from the voltage source when no energy supply from the voltage source is necessary.

8. The waveguide driving circuit according to claim 1, further including a diode connected as a freewheeling diode between the first terminal of the choke and the second terminal of the voltage source.

9. The waveguide driving circuit according to claim 8, further comprising a third switch connected between the second terminal of the choke and the second terminal of the voltage source and implemented to keep a magnetic field energy in the choke at a, except for losses, constant quantity by closing a circuit through the diode and the choke.

10. The waveguide driving circuit according to claim 1, wherein the first switch, the second switch, the third switch, the first switched current regulating circuit or the second switched current regulating circuit includes a semiconductor switch.

* * * * *